(12) United States Patent
Keysar et al.

(10) Patent No.: US 7,516,431 B2
(45) Date of Patent: Apr. 7, 2009

(54) METHODS AND APPARATUS FOR VALIDATING DESIGN CHANGES WITHOUT PROPAGATING THE CHANGES THROUGHOUT THE DESIGN

(75) Inventors: Yzhar Keysar, Kohav Yair (IL); Anatoli Shindler, Jerusalem (IL); Yuri Miroshnik, Naaleh (IL)

(73) Assignee: Silicon Design Systems Ltd., Jerusalem (IL)

( * ) Notice: Subject to any disclaimer, the term of this patent is extended or adjusted under 35 U.S.C. 154(b) by 376 days.

(21) Appl. No.: 11/402,526

(22) Filed: Apr. 11, 2006

(65) Prior Publication Data

US 2008/0172639 A1 Jul. 17, 2008

Related U.S. Application Data

(60) Provisional application No. 60/670,783, filed on Apr. 12, 2005.

(51) Int. Cl.
*G06F 17/50* (2006.01)
(52) U.S. Cl. ................................ 716/5; 716/4; 716/6
(58) Field of Classification Search ................ 716/2–6
See application file for complete search history.

(56) References Cited

U.S. PATENT DOCUMENTS

| 5,508,937 | A | 4/1996 | Abato et al. |
| 5,825,661 | A | 10/1998 | Drumm |
| 6,367,056 | B1 | 4/2002 | Lee |
| 6,591,407 | B1 | 7/2003 | Kaufman et al. |
| 6,609,233 | B1 * | 8/2003 | Foltin et al. ................ 716/6 |
| 7,322,019 | B2 * | 1/2008 | Sato et al. ................ 716/10 |
| 2002/0023252 | A1 | 2/2002 | Lee |
| 2007/0033551 | A1 * | 2/2007 | Greaves et al. ............ 716/3 |

OTHER PUBLICATIONS

Wikipedia, The Free Encyclopedia, "Graph Theory", http://en.wikipedia.org/wiki/Graph_theory, printed on Feb. 21, 2006, pp. 1-6.
Wikipedia, The Free Encyclopedia, "Integrated Circuit Design", http://en.wikipedia.org/wiki/IC_design, printed on Feb. 22, 2006, pp. 1-5.
Wikipedia, The Free Encyclopedia, "Glossary of Graph Theory", http://en.wikipedia.org/wiki/Glossary_of_graph_theory, printed on Feb. 21, 2006, pp. 1-12.

* cited by examiner

*Primary Examiner*—Vuthe Siek
(74) *Attorney, Agent, or Firm*—Blakely, Sokoloff, Taylor & Zafman LLP (57) ABSTRACT

Methods and apparatus for validating design changes in an integrated circuit design without propagating the effects of individual design changes to every location in the integrated circuit design. Local sensitivity functions at design nodes are aggregated and merged at interconnecting nodes in a recursive process.

25 Claims, 5 Drawing Sheets

METHODS AND APPARATUS FOR VALIDATING DESIGN CHANGES WITHOUT PROPAGATING THE CHANGES THROUGHOUT THE DESIGN

This application claims the benefit of U.S. Provisional Patent Application Ser. No. 60/670,783, filed Apr. 12, 2005, which is hereby incorporated by reference.

TECHNICAL FIELD

Embodiments of the invention relate generally to the field of circuit design validation and more specifically to methods for validating design changes against design requirements and constraints without modeling and propagating the individual effects of physical circuit changes through the circuit design.

BACKGROUND

A typical integrated circuit (IC) design may be composed of millions of interdependent and interconnected design components (e.g., logic gates, switches, memory cells, buffers, inverters, amplifiers and the like). Creating and verifying a design can consume tremendous amounts of labor-hours and computational resources. Typically, an IC is designed using a computer-aided design (CAD) tool that converts a low-level design description (e.g., a register transfer level description) or high-level design description (e.g., a Hardware Description Language or Verilog description) into a computer model of the IC. The model specifies what every bit of the circuit design does on every clock cycle, and constitutes a logical modeling/verification step of the design. The physical design of the IC takes the logical model of the IC (e.g., RTL model) and a library of design cells (e.g., logic gates), and creates a chip design. This involves figuring out which gates to use, defining physical locations for them and wiring them together. Then, the design is validated by design rule checking and by simulating the performance of the design in a computer model. When problems in the design are identified, there may be a large number of possible hardware modifications to address each problem. Each hardware modification must be tested to determine if the modification fixes the problem and if the modification creates any new problems. Each time a hardware modification is tested, the modification must be modeled and the operation of the modified design must be simulated again. Even if one localized change is made, either the entire design or an entire functional area of the design must be tested to determine the global effects of any the design change. For example, many designs have critical signal timing requirements and corresponding critical signal paths. If a modification is made to one signal path of the design, even a modification to a non-critical signal path, the effect of the modification must be computed for every other signal path to determine if new critical signal paths have been created and whether they meet performance requirements.

In the past, when designs were limited to, perhaps, thousands of elements and interconnections, or even hundreds of thousands, the time and cost of multiple modifications and simulations may have been acceptable. Currently, however, the number of elements, interconnects and signals in a typical design may reach many hundreds of millions. The conventional method of implementing the entire design and then addressing design problems is now very time consuming and to some extent ineffective. For example, IC manufacturing processes are variable and conventional IC design tools make assumptions about the statistics of the variations. In an IC with 10 million signals, for example, a 0.1% error rate can translate to 10,000 design issues that need to be addressed. Addressing this number of problems is very time consuming at best, and prohibitively expensive at worst. And, as noted above, because a design change in one region of the IC can impact performance anywhere else, often the entire design must be reevaluated. Even a slight modification in which one elemental design component is added, modified, or removed, may propagate widely through the design and significantly affect the overall behavior of the design.

Given that there can be a large number of design issues in a complex IC design, that each design issue may have many possible solutions, and that each possible solution may create other design issues, the total number of design iterations may be astronomical. To address this problem, various techniques have been proposed that attempt to reduce the amount of computation required. These techniques are based on limiting and/or identifying the boundaries of the design beyond which the effects of a design modification can be disregarded. Even when such techniques are employed, however, the analysis of multiple proposed modifications on an individual basis is still time consuming, computationally extensive and costly.

For example, a timing violation might be addressed by adding or removing a buffer stage or altering a signal amplitude to shift an edge trigger point. This, of course, has a propagating effect which extends beyond the improved timing of a single stage in the timing path. As the changed delay or amplitude of the signal propagates throughout the portion of the design influenced by the modification, the modification impacts the timing at each stage, which may change the critical paths for the entire design.

Conventional methods for validating such design changes would require another round of physical design and simulation. Therefore, evaluating a range of signal strength changes or a range of potential buffer sizes to determine the optimal value required to resolve the timing violation could be prohibitively expensive.

DESCRIPTION OF THE DRAWINGS

Embodiments of the invention are illustrated by way of example, and not by way of limitation, in the figures of the accompanying drawings in which.

DETAILED DESCRIPTION

Figure 1:
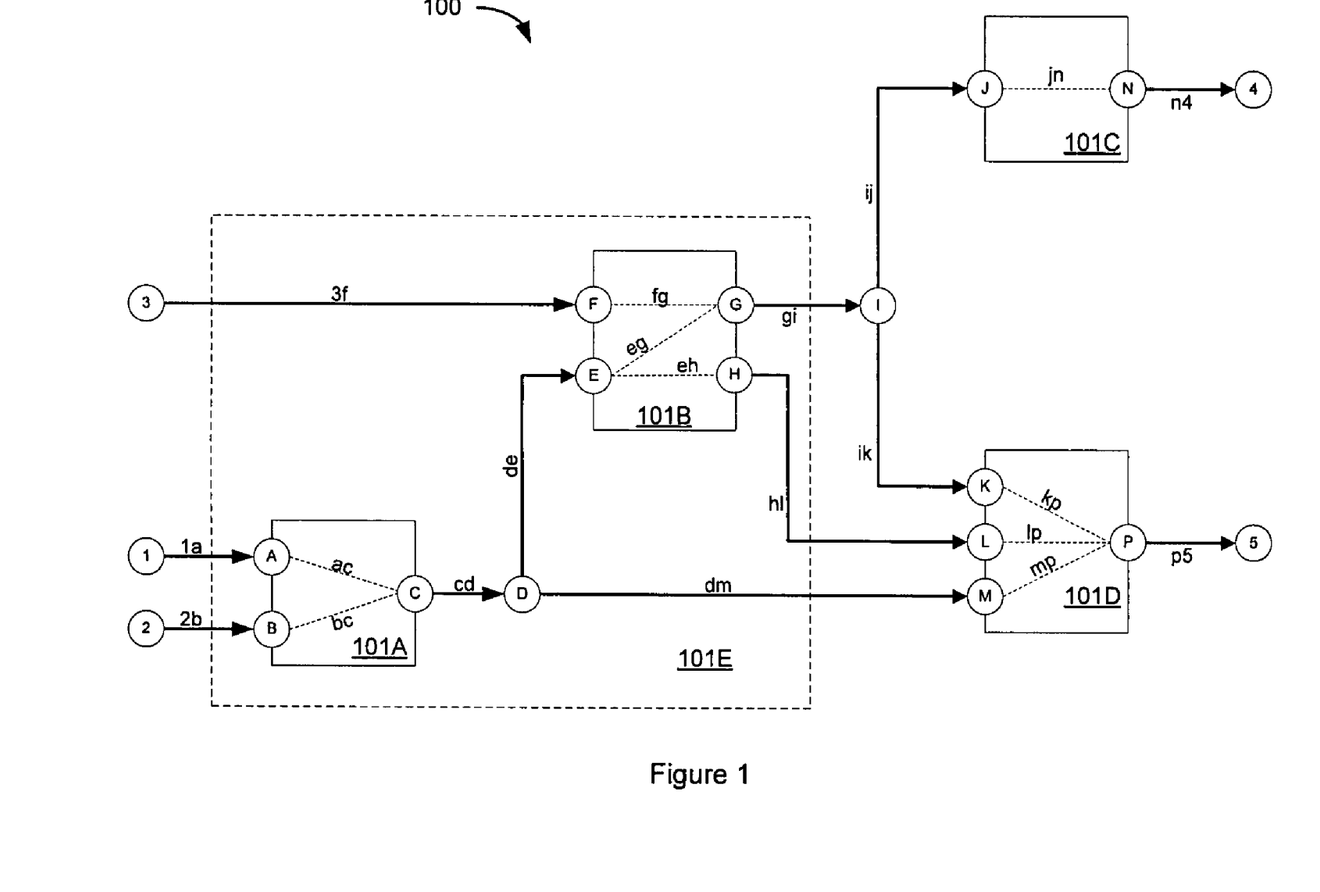
FIG. 1 illustrates an exemplary portion of a circuit design as a directed graph in accordance with one embodiment of the invention.

Methods and apparatus for validating design modifications in an integrated circuit (IC) design are described. An integrated circuit design, or a portion of an integrated circuit design, may be depicted as a directed graph (digraph) of interconnected nodes, such as directed graph 100 of FIG. 1 having nodes A through P. In FIG. 1, each of nodes A through P may represent any type of basic IC design elements (e.g., logic gates, switches, memory cells, buffers, inverters, amplifiers and the like) or combination of the basic IC design elements, which may form part of a standard IC design library. Directed line segments (line segments with an arrowhead denoting direction) between nodes represent connections between nodes, where the direction of the line segment indicates the direction of signal flow in the IC design. In FIG. 1, the connections between nodes are identified by the identifiers of the nodes they connect (e.g., connection "de" connects nodes D and E, connection "ij" connects nodes I and J, etc.)).

Combinations of interconnected nodes may constitute cells, such as cells 101A (consisting of connected nodes A, B and C), 101B (consisting of connected nodes E, F and G), 101C (consisting of connected nodes J and N), and 101D (consisting of connected nodes K, L, M and P). Cells may also be a part of a standard IC design library.

It will be appreciated that individual nodes may represent any combination of lower level nodes and/or cells, and that nodes or cells at a given level may be combined to form higher level nodes and/or cells. For example, node D in FIG. 1 may represent a cell having one input node and two output nodes. Similarly, nodes A through G in FIG. 1, which include cells 101A and 101B, may be combined to form a "macro" cell 101E with three input nodes A, B and F, and three output nodes D, G and H.

Connections within a cell (e.g., connections "ac" and "bc" in cell 101A) are shown as undirected line segments. It may be understood, however, that such line segments direct signals from an input node (a node with a directed line segment pointing to the node) to an output node (a node with a directed line segment pointing away from the node).

In FIG. 1, numbered nodes 1 through 5 may represent physical input and output ports of an IC design. Alternatively, they may represent connection points to other portions of a larger IC design that includes the elements of FIG. 1. Thus, any level of IC design complexity may be represented by using a hierarchical, directed graph, such as the graph of FIG. 1, which will be used as an exemplary graph in the following descriptions of various embodiments of the invention.

Each node in the graph 100 may be characterized by any number of local design factors including the type, number and interconnection of the basic design elements described above. Variations in one of more of the local design factors of a node may be associated with a local effect at the node, which may be expressed as a local node sensitivity function. For example, adding or removing a buffer may change a time delay through the node, so the local node sensitivity function may be expressed as "delay per buffer" with a corresponding numerical value (e.g., nanoseconds/buffer or the like). Changing a signal level within a node, by adding an amplifying or attenuating element for example, may also affect timing by altering the slopes of rising and falling edges in edge-triggered logic components. In this example, the local node sensitivity function might be expressed as "delay per volt." Other local effects at a node due to a change of design factors may include changes in signal levels, changes in noise levels, changes in signal-to-noise ratios or changes in power consumption, for example. Each of these local effects may be related to a local change in one or more of the design factors of the node. The sensitivity functions may be linear functions, nonlinear functions or piecewise linear functions, for example.

Each directed connection between the nodes may be characterized by an internode transformation function that relates the output of one node to the input of another node. For example, a passive wired connection between nodes may be characterized by a time delay and/or a signal level change due to attenuation. Alternatively, a connection may include active elements (e.g., buffers, amplifiers, etc), in which case the internode transformation function may be characterized by signal delay and/or signal gain. In this respect, the directed connections between nodes may be viewed as having node-like characteristics which may be sensitive to design changes in any elements that make up the directed connections. The internode transformation functions, like the node sensitivity functions, may be linear functions, nonlinear functions and/or piecewise linear functions, for example. Those skilled in the art will understand that the boundaries between nodes and their interconnections may be somewhat fluid and at the discretion of the IC designer. For clarity in the following descriptions, however, it will be assumed that the difference between nodes and internode connections is distinct, with the former characterized by node sensitivity functions and the later characterized by internode transformation functions as described above.

In graph theory terminology, graph 100 may be described as a directed, acyclic, simple graph G<E, V>, having a set of vertices (nodes) V, and edges (interconnections between pairs of vertices) E. Acyclic meaning that the graph has no circular paths and simple meaning that there is one edge between each pair of vertices (those skilled in the art will understand that a non-simple graph may be decomposed into a simple graph by node splitting, for example). Such a graph is also known as a tree. A subtree of the graph G is a subgraph of G that is also a tree. In FIG. 1, for example, the subgraph that includes nodes I, J, K, N, P, 4 and 5 (and their edges) is a subtree of graph 100 with node I as a root node. In a directed graph, a subtree may be defined as a "downstream" subtree or an "upstream" subtree. A downstream subtree is a subtree that branches in the direction of signal flow. An upstream subtree is a subtree that branches against the direction of signal flow. For example, the aforementioned subgraph including nodes I, J, K, N, P, 4 and 5 is an example of a downstream subtree with root node I. In contrast, the subtree consisting of the nodes I, G, F, E, D, C, A, B, 1, 2 and 3 (and their edges) is an example of an upstream subtree with root node I. A node at the end of a tree or subtree, which is connected to the free or subtree by only one edge, is known as a "leaf." Those skilled in the art will appreciate that any given tree structure may be parsed into subtrees in a multitude of ways. In particular, for the purposes of circuit analysis, any node may be chosen as a root node to determine how a local design change in that node will propagate effects through subtrees to the rest of the circuit, as described in detail below.

Figure 2:
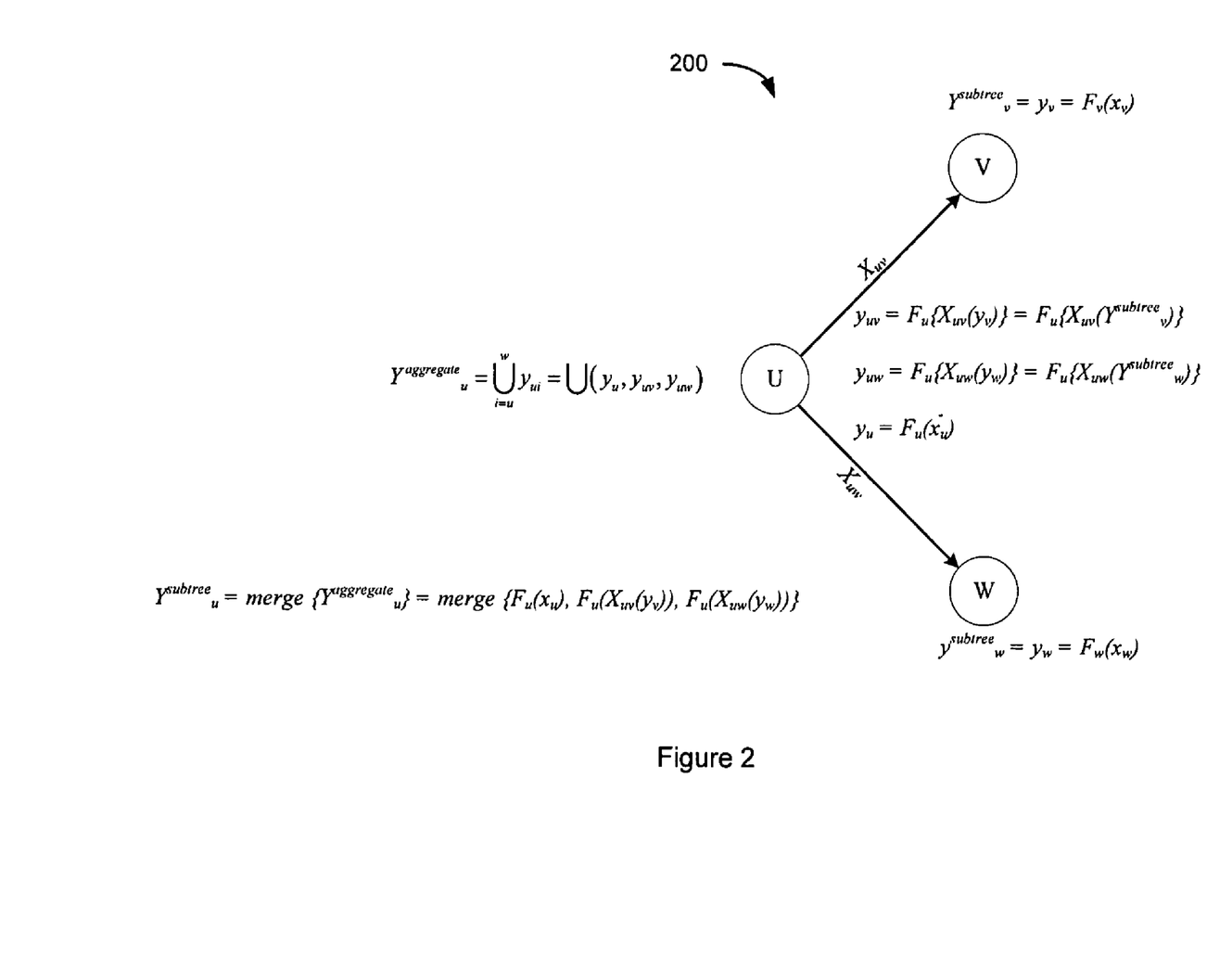
FIG. 2 illustrates the characterization of an exemplary subtree of a graph in accordance with one embodiment of the invention.

Given a node v, in a graph G<E, V>, the sensitivity of that node to a change in a local design factor (local cause) may be represented as $y_v = F_v(x_v)$, where $x_v$ is the local cause, $y_v$ is the local effect, and $F_v$ is the node sensitivity function of node v. Given an edge uv with a transformation function $X_{uv}$ between a pair of nodes u and v, the local effect $y_v$ at node v may be transformed to a propagated local cause at node u as $x_{uv} = X_{uv}(y_v)$ This formalism may be generalized to a tree structure, such as the tree structure 200 illustrated in FIG. 2. FIG. 2 illustrates an upstream analysis from leaf nodes v and w to node u. At node v, a local cause $x_v$ is manifested as a local effect $y_v = F_v(X_v)$. Note that $y_v$ is equal to $Y^{subtree}_v$ because a leaf is its own subtree. The local effect $Y^{subtree}_v$ at node v is transformed to a propagated cause at node u as $x_{uv} = X_{uv}(y_v)$, as described above. Similarly, at node w, a local cause $x_w$ is manifested as a local effect $Y^{subtree}_w = y_w = F_w(x_w)$. The local effect $Y^{subtree}_w$ at node w is transformed to a propagated cause at node u as $x_{uw} = Xw(y_w)$. Node u may also have its own local cause $x_u$. Therefore, node u may have three causes; local cause $x_u$, and propagated causes $x_{uv}$ and $x_{uw}$ (note that the number of causes at a node will in general equal the number of edges leaving the node (or entering the node in a downstream analysis) plus one. In general, the node sensitivity functions and transformation functions for an upstream analysis will be the inverse of the corresponding functions for a downstream analysis.

Each cause at node u may have an effect at node u. Using the notation developed above, local cause $x_u$ may produce an effect $y_u = F_u(x_u)$ at node u, propagated cause $x_{uv}$ may produce an effect $y_{uv} = F_u(x_{uv})$ at node u, and propagated cause $x_{uw}$ may produce an effect $y_{uw} = F_u(x_{uw})$ at node u. The effects at node u due to the local and propagated causes at node u constitute an aggregated response function at node u, which may be described in set notation as the union of the effects at node u, $$Y_u^{aggregate} = \bigcup_{i=u}^{w} y_{ui}.$$

Figure 3:
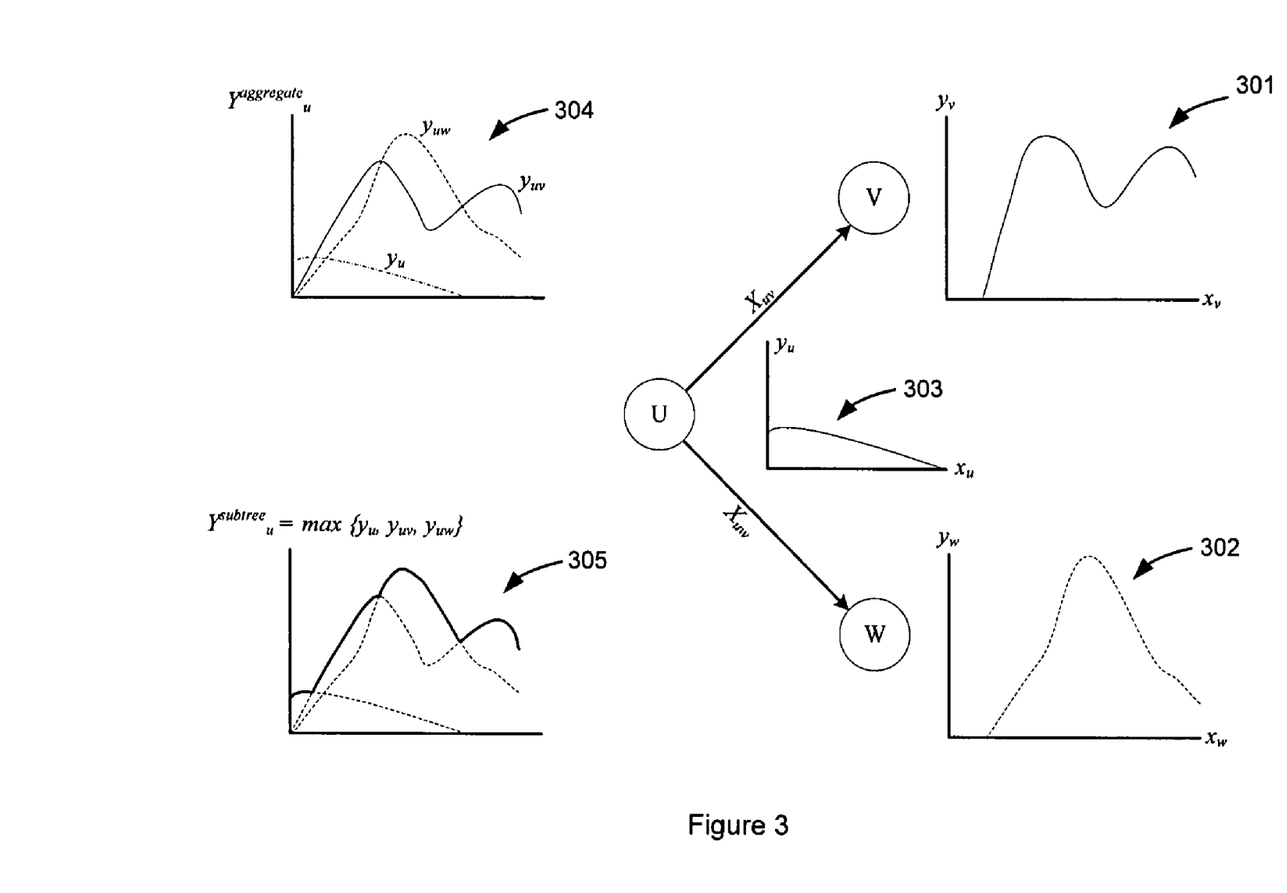
FIG. 3 illustrates a graphical characterization of the exemplary subtree of FIG. 2 in accordance with one embodiment of the invention.

A function may then be defined to operate on $Y_u^{aggregate}$ that defines a response function $Y_u^{subtree}$ at node u, which relates the effects at node u to any changes in the design factors (causes) at nodes in the subtree of node u (including node u). That is, a function merge may be defined such that $Y_u^{subtree} = \text{merge}\{Y_u^{aggregate}\}$. The merge function may be chosen to produce any desired class of analysis. For example, the merge function may select the maximum of the $Y_u^{aggregate}$ function, the minimum of the $Y_u^{aggregate}$ function, an expected value of the $Y_u^{aggregate}$ function, or any other function or combination thereof that may be of interest to the designer with respect to the effects of possible design modifications. FIG. 3 illustrates, graphically, the use of the merge function to select the maximum value of the effects at node u in the tree structure 200 of FIG. 2. In FIG. 3, graph 301 illustrates a relationship between a local cause at node v, $x_v$, and the local effect at node v, $y_v$. Graph 302 illustrates a relationship between a local cause at node w, $x_w$ and the local effect at node w, $y_w$. Graph 303 illustrates a relationship between a local cause at node u, $x_u$ and the local effect at node u, $y_u$. Graph 304 illustrates the function $Y_u^{aggregate}$, illustrating the effects at node u due to local and propagated causes in the subtree of node u. Graph 305 illustrates the response function $Y_u^{subtree}$ for the case of merge$\{Y_u^{aggregate}\} = \max\{Y_u^{aggregate}\}$.

Once the node sensitivity functions and internode transformation functions for an IC design have been characterized, the process described above may be applied recursively, starting at any selected node or nodes in the IC design, and propagated to any or all other nodes in the IC design to obtain sensitivity functions that relate local design changes at the selected nodes to global response functions. That is, the response functions for the entire design, over all connected node pairs <i, j>, may be calculated as $Y_i^{subtree} = \text{merge}\{F(x_i), X_{<i,j>}(Y_j^{subtree})\}$. Using a merge function at each node reduces the total number of calculations that are required to analyze the global effects of local design changes. In the example above, for instance, only the merge function is propagated to the next node, rather than the three aggregate functions (i.e., the one local function at node u and the two propagated functions from connected nodes v and w). A set of merged response functions may be stored in a database or lookup table, for example.

Given a change in any local cause $x_i$ at a node, the response at any other node can then be obtained by applying $x_i$ as an index to the database or lookup table. Given an initial design that has been characterized in this manner with an initial set of causes $\overline{x_0}$, the global effects of a new set of causes $\overline{x_1}$ can easily be determined by comparing the response functions $Y_i^{subtree}(\overline{x_1})$ with $Y_i^{subtree}(\overline{x_0})$.

Figure 4:
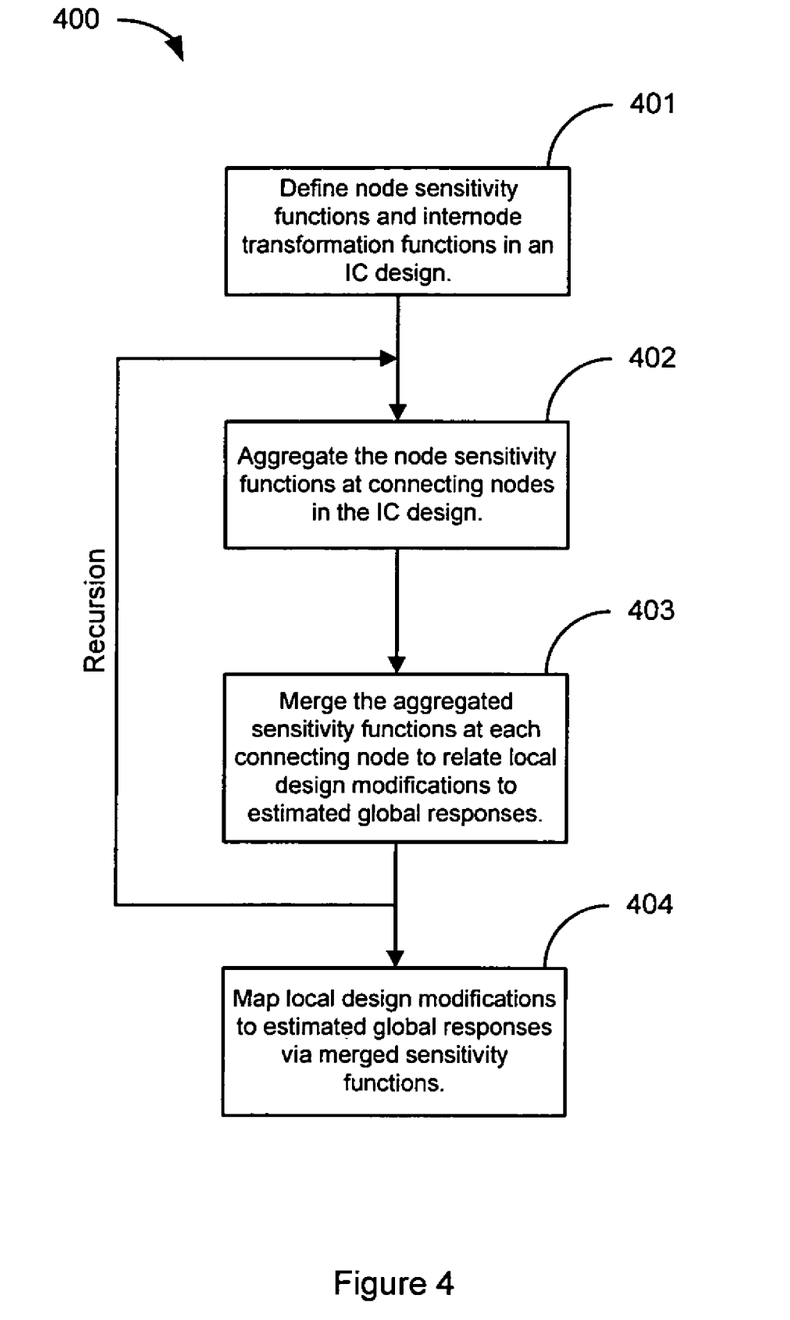
FIG. 4 is a flowchart illustrating a method in accordance with one embodiment of the invention.

FIG. 4 illustrates a method 400 in one embodiment of the invention. At operation 401, the local node sensitivity functions and internode transformation functions of an IC design are defined as described above. At operation 402, the local node sensitivity functions are aggregated at connecting nodes in the IC design to obtain aggregated sensitivity functions at each connecting node. In one embodiment, the local node sensitivity functions are aggregated by propagating the local node sensitivity functions through internode transformation functions to obtain propagated sensitivity functions at each connecting node, and combining the propagated sensitivity functions with the local sensitivity function of the connecting node. At operation 403, the aggregated functions at each connecting node are merged into sensitivity functions that relate local design modifications to estimated global responses. Operations 402 and 403 may be repeated recursively, as described above, until estimated global response functions for any or all nodes are calculated. At operation 404, local design changes at any selected nodes may be mapped to estimated global responses via the merged sensitivity functions. Thus, for any proposed modification, the impact on the entire design, or any specified portion of the design, is known without the costly and time-consuming analysis required in prior art schemes.

Figure 5:
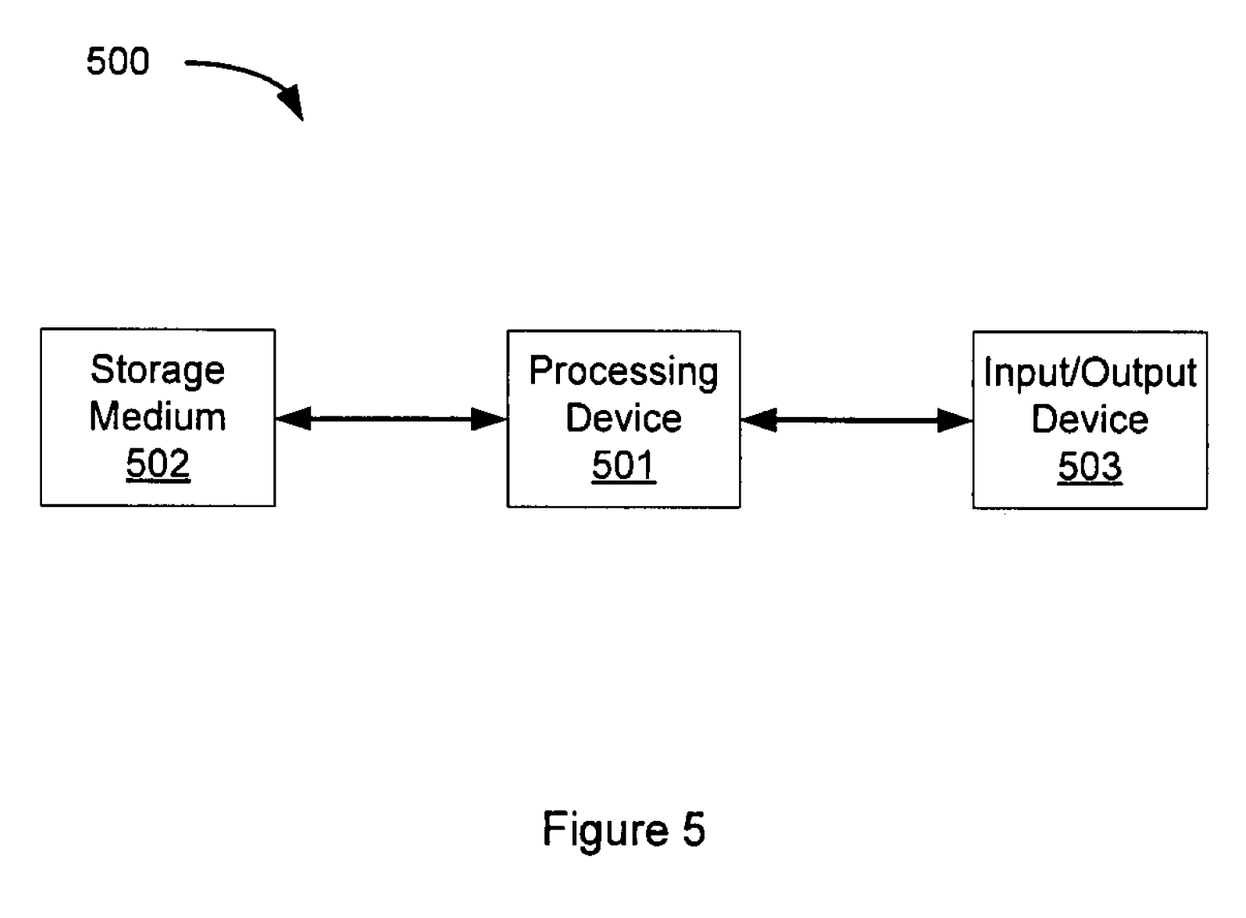
FIG. 5 illustrates a system in accordance with one embodiment of the invention.

FIG. 5 illustrates a system 500 in which features of the present invention may be implemented. System 500 may include a data processing device 501 to execute instructions, stored on a machine-accessible medium, which may cause processing device 501 to perform operations, such as the operations described with respect to the method 400, for example. Data processing device 501 may be a general purpose processing device such as a microprocessor, a microcontroller or the like. Data processing device 501 may also be a special purpose processing device such as an application specific integrated circuit (ASIC), field programmable gate array (FPGA), digital signal processor (DSP) or the like. System 500 may also include a storage medium 502, coupled with data processing device 501, which may be a machine-accessible medium including instructions, that when accessed by a machine, such as data processing device 501, cause the machine to perform operations such as the operations of method 400 described above. System 500 may also include an input/output (I/O) device 503, coupled with the data processing device 501, to provide a communication interface with data processing device 501. I/O device devices are known in the art and, accordingly, are not described in detail.

It will be appreciated that terms such as "processing," "computing," "determining," "estimating," "defining," "aggregating," "merging" or the like may refer to the actions and processes of a computer system, or similar electronic computing device, that manipulates and transforms data represented as physical (e.g., electronic) quantities within the computer system's registers and memories into other data similarly represented as physical changes within the computer system memories or registers or other such information storage, transmission or display devices.

Some portions of the detailed descriptions above are presented in terms of algorithms and symbolic representations of operations which may be performed on data bits within a computer memory. These algorithmic descriptions and representations are the means used by those skilled in the data processing arts to most effectively convey the substance of their work to others skilled in the art.

An algorithm is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It will be apparent from the foregoing description that aspects of the present invention may be embodied, at least in part, in software. That is, the techniques may be carried out in a computer system or other data processing system in response to its processor, such as data processing device 501, for example, executing sequences of instructions contained in a machine-accessible medium, such as storage medium 502, for example. In various embodiments, hardware circuitry may be used in combination with software instructions to implement the present invention. Thus, the techniques are not limited to any specific combination of hardware circuitry and software or to any particular source for the instructions executed by the data processing system. In addition, throughout this description, various functions and operations may be described as being performed by or caused by software code to simplify description. However, those skilled in the art will recognize what is meant by such expressions is that the functions result from execution of the code by a processor or controller, such as data processing device 501. If written in a programming language conforming to a recognized standard, software instructions to implement the methods described herein can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

A machine-accessible medium can be used to store software and data which when executed by a data processing system causes the system to perform various methods of the present invention. This executable software and data may be stored in various places including, for example, storage medium 502 or any other device that is capable of storing software programs and/or data. A machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

It should be appreciated that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment.

Furthermore, the particular features, structures or characteristics may be combined as suitable in one or more embodiments of the invention. In addition, while the invention has been described in terms of several embodiments, those skilled in the art will recognize that the invention is not limited to the embodiments described. The embodiments of the invention can be practiced with modification and alteration within the scope of the appended claims. The specification and the drawings are thus to be regarded as illustrative instead of limiting on the invention.

What is claimed is:

1. A method, comprising:

defining local node sensitivity functions and internode transformation functions in an integrated circuit (IC) design, wherein the node sensitivity functions comprise at least one of a time delay sensitivity function, a signal-to-noise sensitivity function, a noise sensitivity function and a power dissipation sensitivity function;

aggregating the local node sensitivity functions at connecting nodes in the IC design to obtain aggregated sensitivity functions at each connecting node;

merging the aggregated sensitivity functions at each connecting node to obtain merged sensitivity functions relating local design modifications to estimated global responses;

mapping the local design modifications to the estimated global responses via the merged sensitivity functions; and storing the estimated global responses to predict an impact of a local design modification to the IC design.

2. The method of claim 1, wherein aggregating the node sensitivity functions at each connecting node comprises propagating the local node sensitivity functions through the internode transformation functions to obtain propagated sensitivity functions at each connecting node, and combining the propagated sensitivity functions with the local sensitivity function of the connecting node.

3. The method of claim 1, wherein mapping the local design modifications to the estimated global responses comprises:

changing input values to the local node sensitivity functions; and propagating the input values through aggregated and merged sensitivity functions of intermediate nodes to each node of the IC design.

4. The method of claim 1, wherein the local design modifications comprise at least one of a time delay modification and a signal level modification.

5. The method of claim 1, wherein the node sensitivity functions comprise at least one of a linear function, a piecewise linear function and a non-linear function.

6. The method of claim 1, wherein the transformation functions comprise at least one of a time delay function and a gain function.

7. The method of claim 1, wherein the merged sensitivity functions comprise at least one of a worst case response function, a best case response function and an expected response function.

8. The method of claim 1, wherein the estimated global responses comprise at least one of a time delay response, a signal-to-noise response, an absolute noise response and a power dissipation response.

9. An article of manufacture, comprising:

a machine-accessible storage medium including data that, when accessed by a machine, cause the machine to perform operations comprising:

defining local node sensitivity functions and internode transformation functions in an integrated circuit (IC) design, wherein the node sensitivity functions comprise at least one of a time delay sensitivity function, a signal-to-noise sensitivity function, a noise sensitivity function and a rower dissipation sensitivity function;

aggregating the local node sensitivity functions at connecting nodes in the IC design to obtain aggregated sensitivity functions at each connecting node;

merging the aggregated sensitivity functions at each connecting node to obtain merged sensitivity functions relating local design modifications to estimated global responses;

mapping the local design modifications to the estimated global responses via the merged sensitivity; and storing the estimated global responses to predict an impact of a local design modification to the IC design.

10. The article of manufacture of claim 9, wherein aggregating the node sensitivity functions at each connecting node comprises propagating the local node sensitivity functions through the internode transformation functions to obtain propagated sensitivity functions at each connecting node, and combining the propagated sensitivity functions with the local sensitivity function of the connecting node.

11. The article of manufacture of claim 9, wherein mapping the local design modifications to the estimated global responses comprises:
changing input values to the local node sensitivity functions; and
propagating the input values through aggregated and merged sensitivity functions of intermediate nodes to each node of the IC design.

12. The article of manufacture of claim 9, wherein the local design modifications comprise at least one of a time delay modification and a signal level modification.

13. The article of manufacture of claim 9, wherein the node sensitivity functions comprise at least one of a linear function, a piecewise linear function and a non-linear function.

14. The article of manufacture of claim 9, wherein the internode transformation functions comprise at least one of a time delay function and a gain function.

15. The article of manufacture of claim 9, wherein the merged sensitivity functions comprise at least one of a worst case response function, a best case response function and an expected response function.

16. The article of manufacture of claim 9, wherein the estimated global responses comprise at least one of a time delay response, a signal-to-noise response, an absolute noise response and a power dissipation response.

17. A system, comprising a processing device, wherein the processing device is configured to:
define local node sensitivity functions and internode transformation functions in an integrated circuit (IC) design, wherein the node sensitivity functions comprise at least one of a time delay sensitivity function, a signal-to-noise sensitivity function, a noise sensitivity function and a rower dissipation sensitivity function;
aggregate the local node sensitivity functions at connecting nodes in the IC design to obtain aggregated sensitivity functions at each connecting node;
merge the aggregated sensitivity functions at each connecting node to obtain merged sensitivity functions relating local design modifications to estimated global responses;
map the local design modifications to the estimated global responses via the merged sensitivity; and
store the estimated global responses to predict an impact of a local design modification to the IC design.

18. The system of claim 17, wherein to aggregate the sensitivity functions at each node the processing device is configured to propagate the local node sensitivity functions through the internode transformation functions to obtain propagated sensitivity functions at each connecting node, and to combine the propagated sensitivity functions with the local sensitivity function of the connecting node.

19. The system of claim 17, wherein to map the local design modifications to the estimated global responses, the processing device is configured to:
change input values to the local node sensitivity functions; and
propagate the input values through aggregated and merged sensitivity functions of intermediate nodes to each node of the IC design.

20. The system of claim 17, wherein the local design modifications comprise at least one of a time delay modification and a signal level modification.

21. The system of claim 17, wherein the sensitivity functions comprise at least one of a linear function, a piecewise linear function and a non-linear function.

22. The system of claim 17, wherein the transformation functions comprise at least one of a time delay function and a gain function.

23. The system of claim 17, wherein the estimated global responses comprise at least one of a time delay response, a signal-to-noise response, an absolute noise response and a power dissipation response.

24. The system of claim 17, wherein the merged sensitivity functions comprise at least one of a worst case response function, a best case response function and an expected response function.

25. An apparatus, comprising:
means for defining local node sensitivity functions and internode transformation functions in an integrated circuit (IC) design, wherein the node sensitivity functions comprise at least one of a time delay sensitivity function, a signal-to-noise sensitivity function, a noise sensitivity function and a power dissipation sensitivity function;
means for aggregating the local node sensitivity functions at connecting nodes in the IC design to obtain aggregated sensitivity functions at each connecting node;
means for merging the aggregated sensitivity functions at each connecting node to obtain merged sensitivity functions relating local design modifications to estimated global responses;
means for mapping the local design modifications to the estimated global responses via the merged sensitivity; and
means for storing the estimated global responses to predict an impact of a local design modification to the IC design.

* * * * *